United States Patent Office 3,448,084
Patented June 3, 1969

3,448,084
POLYESTERS FROM TRIS(2-HYDROXYETHYL) ISOCYANURATE
Donald L. Burdick and William C. Francis, Overland Park, and Joseph W. Jones, Jr., Leawood, Kans., assignors to Gulf Oil Corporation, Pittsburgh, Pa., a corporation of Pennsylvania
No Drawing. Continuation-in-part of application Ser. No. 109,017, May 10, 1961. This application June 10, 1964, Ser. No. 374,185
Int. Cl. C08g 17/06, 20/32
U.S. Cl. 260—75     3 Claims This invention relates to the manufacture of a novel and useful class of polyesters. More particularly, this invention is concerned with the manufacture of beta-hydroxyethyl isocyanurates and the manufacture of polyesters thereof with carboxylic acids having at least two carboxy groups and from two to about sixty carbon atoms.

The novel polyesters which may be made by the method of this invention are based upon a group of beta-hydroxyethyl (or 2-hydroxyethyl) isocyanurates represented by the following structural formulas:

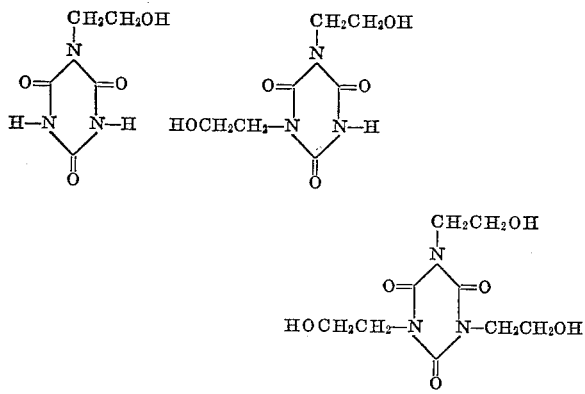

The synthesis of these and other isocyanurates and polyesters thereof is disclosed in copending U.S. patent application Ser. No. 109,017, of which this is a continuation-in-part.

Briefly, the novel polyesters of this invention are made by a method which comprises the steps.

(a) reacting an alkali metal cyanurate with an ethylene halohydrin in an inert, highly polar solvent to yield a 2-hydroxyethyl isocyanurate reaction product of which a substantial proportion possesses from two to three 2-hydroxyethyl groups per molecule, and
(b) reacting the 2-hydroxyethyl isocyanurate reaction product of step (a) with a reagent selected from the group consisting of carboxylic acids having at least two carboxy groups and from two to about sixty carbon atoms and their corresponding acid halides and acid anhydrides, to yield a polyester product. Following is a more detailed discussion of the method.

The 2-hydroxyethyl isocyanurate compounds employed in making the polyesters of this invention can be prepared by bringing together an alkali metal cyanurate and an ethylene halohydrin under suitable reaction conditions. A desirable method of carrying on the reaction is to add initially an alkali metal cyanurate to an inert liquid reaction medium. The alkali metal salt can suitably be the sodium or potassium salt, as desired. It has been found preferable and convenient to employ the sodium salt. The salt can be pre-formed and added to the inert solvent or it can be formed in situ as by adding the correct amount of the base such as potassium or sodium hydroxide to a mixture of cyanuric acid in the inert liquid reaction medium. Additionally, amine resinate salts of cyanuric acid have been found suitable for use in the processes. The cyanurate salts of basic anion exchange resins, such as quaternary ammonium hydroxide-substituted polystyrene resins may be used. A specific example is the cyanurate salt of Amberlite IRA-400. Use of calcium, pyridine, and tripropylamine cyanurate salts has not been found to provide satisfactory yields.

The liquid reaction medium can be any inert, highly polar solevnt. By inert is meant that the solvent is relatively unreactive with the reactants and products, thereby not precluding reasonable yields of the desired product. It has been found suitable to employ as the medium a lower dialkylamide of a lower carboxylic acid, for example, acyclic amides such as dimethylformamide, diethylformamide, dimethylacetamide, and the like, and, additionally, cyclic N-alkyl substituted amides wherein one of the N-alkyl substituents has combined with the alkyl chain of the carboxylic acid to form a cycloalkyl ring. Illustrative cyclic N-alkyl substituted amides include N-alkyl substituted pyrrolidones and piperidones in which the N-alkyl group has one to three carbon atoms, preferably being methyl. Additionally, dialkyl sulfoxides such as dimethyl sulfoxide have been found highly suitable. Water at a pH sufficiently high to permit presence of cyanuric acid in salt form, as above defined, can be employed as reaction medium. Certain solvents have been found and are presently believed to be undesirably, inasmuch as little or no product results from their use, and for other reasons. Illustrative of these relatively inoperative solvents are acetonitrile, p-xylene, and excess ethylene chlorohydrin reactant.

It has been found preferable to add the ethylene halohydrin agent to the mixture of the alkali metal salt of cyanuric acid in the reaction medium. Sufficient reaction medium should be employed to permit efficient formation of the desired isocyanurates, that is, to permit good stirring, mixing and heat exchange. Customarily, if an alkali metal cyanurate salt, e.g., trisodium cyanurate, is used, it has been found that a concentration of about 200 grams of the cyanurate salt per liter of medium is a suitable concentration, depending upon the particular medium employed, the nature of the reaction product being formed, the temperature of the reaction, and like considerations.

The reaction is carried on as by introducing the ethylene halohydrin in a dropwise manner into the reaction mixture. It is desirable during the addition of the ethylene halohydrin to the reaction mixture, to agitate the mixture by a suitable means such as a rotating stirrer, so as to bring about a homogeneous distribution of reactants.

After the addition of the ethylene halohydrin to the reaction mixture, customarily the reaction mixture will be maintained at a reaction temperature for a period of time as required to bring about as nearly as possible and practicable a complete reaction. As to the ethylene halohydrin agent, it is presently preferred to employ ethylene chlorohydrin because of its reactivity and adaptability to the reaction conditions. However, ethylene iodohydrin or ethylene bromohydrin can also be used if desired. At least a stoichiometric amount of the ethylene halohydrin agent will be added as required to bring about one, two, or three substitutions on the isocyanurate rings. At times it will be desired to add a fractional average number of substitutents, that is, for example, at times it will be desired to provide a reaction product having about an average of 1.5 or 2.5 2-hydroxyethyl groups per isocyanurate ring.

On completion of the addition of the reactants, the reaction mixture is maintained at a reaction temperature for an additional period as required in order to provide an efficient utilization of the reactants. The reaction mixture is cooled, whereupon customarily any unreacted cyanurate salt and quantities of other reaction products such as sodium chloride usually precipitate. If the volume is quite large, the precipitation of the cyanurate salt and unwanted reaction products can be augmented as by evaporation of a small portion of the solvent, being careful not to evaporate such a great amount of the solvent so as to induce precipitation of the formed substituted isocyanurate. This precipitate can be removed in any conventional manner as by filtration, centrifugation, or decantation. The 2-hydroxyethyl substituted isocyanurate product in the remaining reaction filtrate can be removed by following standard procedures, as by substantially reducing the volume of the filtrate by evaporation, precipitating the product as by adding a solvent to the filtrate in which the reaction product is insoluble, or by any other desired standard isolation procedure. The products on isolation are further processed and purified as by washing, recrystallizing, and drying, as desired. If the reaction medium is water, the above procedure will be amended to the extent that the reaction medium is evaporated to dryness and the isocyanurate product is dissolved in a solvent such as lower alkanol (e.g., methanol or ethanol) leaving a residue of unwanted reaction products.

Polyesters can readily be formed by reacting isocyanurates having two to three N-(2-hydroxyethyl) groups, which can be prepared by the above procedures, and carboxylic acids having at least two carboxy groups and from two to about sixty carbon atoms. In forming the polyesters, suitable elevated reaction temperatures may be used as hereinafter illustrated in the examples. Customary catalysts used by those skilled in the art of polyester manufacture are desirably utilized.

Suitable polycarboxylic acids for polyester formation include both aryl and aliphatic dicarboxylic acids, illustrative of which are succinic, adipic, phthalic, isophthalic, terephthalic, sebacic, 1,4-naphthalenedicarboxylic, azelaic, glutaric, 3-ethylsebacic, and the like carboxylic acids, as well as dimers of unsaturated fatty acids, said dimers having about 32 to 40 carbon atoms. Polycarboxylic acids having more than two carboxy groups may be used, such use being limited mainly by cost and availability. Various oligomers of unsaturated fatty acids, such as trimer acid are particularly useful. (These aligomers of unsaturated fatty acids may contain 60 or more carbon atoms.) Also suitable are trimellitic acid or anhydride, citric acid, pyromellitic acid or anhydride, tris (2-carboxyethyl) isocyanurate, tris (carboxymethyl) isocyanurate, and various polycarboxylic condensation products, as for example, the product of esterification of one mole of a glycol with two moles of trimellitic anhydride. When appropriate, corresponding acid halides or anhydrides can be employed as the polycarboxylic acid reagent. Relative proportions of the isocyanurates and polycarboxylic acids will be selected to insure polyester formation. Portions of the 2-hydroxyethyl substituted isocyanurate employed, usually not in excess of about fifty percent thereof, can be and often are desirably replaced in the ester formation reaction mixtures with equivalent quantities of glycols commonly employed in polyester formation. Glycols such as the following having two to twelve carbon atoms are suitable for such substitution in the reaction mixtures: ethylene glycol, propylene glycol, hexamethylene glycol, neopentyl glycol, diethylene glycol, decamethylene glycol, 2,2-dimethyl-1,3-propanediol, and the like.

The mono (2-hydroxyethyl) isocyanurate and di (2-hydroxyethyl) isocyanurate are acidic compounds which can exist as their free acids or salts, both forms being referred to herein generically by the above respective names. Di (2-hydroxyethyl) isocyanurate is particularly adapted to formation of strictly linear polyesters which, after formation, can be modified if desired by partial or complete substitution on the remaining isocyanurate nitrogen atoms. For example, the linear polyesters may be reacted with acrylonitrile to effect cyanoethyl substitution, with allyl chloride to yield allyl substituents, or with other reagents which are known to produce N-substitution on cyclic imide structures.

The mono (2-hydroxyethyl) isocyanurate is particularly useful for termination of polyester chains, especially polyesters derived from di- and tris (2-hydroxyethyl) isocyanurate, so that modified polymers of controlled molecular weight can be obtained with substituent groups located at the ends of the chains. An economically preferable method of making modifiable polyesters of this type consists of the following steps:

(a) reacting an alkali metal cyanurate such as sodium or potassium cyanurate with ethylene chlorohydrin in an inert, highly polar solvent reaction medium such as dimethylformamide or dimethylsulfoxide to yield a reaction product consisting essentially of a mixture of mono- and di (2-hydroxyethyl) isocyanurate, and (b) reacting the isocyanurate product of step (a) with a suitable polycarboxylic acid, anhydride or acid chloride.

Alternatively the mono- and di- or tris (2-hydroxyethyl) isocyanurates can be made separately, mixed together in controlled proportions and esterified.

In general, the hydroxyethyl isocyanurates and esters thereof provided by this invention are useful as intermediates in the formation of polymers useful in the molding of plastic articles in coating applications, and the like. Some of the compounds provided hereby have polymer plasticizing and oil additive utilities.

The following examples are presented in further illustration of this invention but not in limitation thereof. It will be obvious to those skilled in the art that variations can be made without departing from the spirit and scope of this invention. Such obvious departures are meant to be within the scope of this invention as are consonant with the claims appended hereto.

EXAMPLE 1

Preparation of tris (2-hydroxyethyl) isocyanurate

Trisodium cyanurate (39 g. 0.2 mole) is slurried in 200 ml. of dimethylformamide, and one gram of solid sodium hydroxide is added to the mixture. While maintaining the mixture at a temperature in the range of 135° to 140° C., 0.6 grams (0.6 mole) of ethylene chlorohydrin is added dropwise with stirring over a period of three hours. The reaction is continued after the addition at the above temperature range for an additional four-hour period, after which the reaction mixture is cooled. The cooled reaction mixture is filtered, the precipitate is discarded, and the filtrate containing the desired tris (2-hydroxyethyl) isocyanurate product is evaporated in vacuo to remove the reaction solvent. The residue of tris (2-hydroxyethyl) isocyanurate is taken up in hot ethanol. The ethanol solution is cooled, bringing about the precipitation of the tris (2-hydroxyethyl) isocyanurate product, which is removed by filtration, is washed by slurrying with cold ethanol, and is dried, providing a yield of a white crystalline solid product of 17.6 g.

EXAMPLE 2

Preparation of tris (2-hydroxyethyl) isocyanurate

Trisodium cyanurate (19.5 g., 0.1 mole) is slurried in 100 ml. of dimethyl sulfoxide. The mixture is heated and maintained at a temperature of 80° to 85° C. Ethylene chlorohydrin (24.2 g., 0.3 mole) is added dropwise, with stirring, over a period of one hour. After the addition, the reaction is continued at the above temperature range for a period of twenty hours. The reaction mixture is processed as described in Example 1 whereby a yield of crystalline tris (2-hydroxyethyl) isocyanurate of 10.4 g. is obtained.

Following the above procedure, with the exception that ethylene chlorohydrin p-exylene, and acetonitrile are successively substituted as the liquid reaction media for dimethyl sulfoxide, it is found that little or no yield of product is obtained.

EXAMPLE 3

Preparation of a polyester of tris (2-hydroxyethyl) isocyanurate

A mixture of 2.0 g. (0.008 mole) of tris (2-hydroxyethyl) isocyanurate and 1.7 g. (0.012 mole) phthalic anhydride is heated with stirring at 280° C. for forty-five minutes. The reaction results in a product consisting of a tris (2-hydroxyethyl) isocyanurate-phthalate polyester having a gel point of sixty minutes at 280° C. The ester forms a clear, brittle film having a Sward hardness of 34.

A corresponding polyester of terephthalic acid is made, for example, by reacting equimolar quantities of tris (2-hydroxyethyl) isocyanurate and dimethyl terephthalate and distilling off the methanol produced by the ester interchange reaction. Conventional ester interchange catalysts and inert solvents may be employed. The resulting polyester also forms a hard clear film, which is more resistant to softening on heating, as compared with the phthalate polyester.

EXAMPLE 4

Preparation of a mixed polyester of tris (2-hydroxyethyl) isocyanurate

To a stirred reactor is charged 92.5 parts by weight of tris (2-hydroxyethyl) isocyanurate, 27.0 parts by weight of propylene glycol and 86.1 parts by weight of adipic acid. The mixture is heated with stirring under a nitrogen atmosphere to about 147° C., at which point water begins to distill over. Heating and stirring are then continued, with removal of water, for approximately 6 hours, a maximum temperature of about 160° C. being reached during that time. When an acid number of about 60 is reached, the reaction product is cooled rapidly to room temperature. The resin is soluble in methyl ethyl ketone and a solution in this solvent may be used in formulating coating compositions.

EXAMPLE 5

Preparation of a mixed polyester of tris (2-hydroxyethyl) isocyanurate

To a stirred reactor is charged 86.2 parts by weight of tris (2-hydroxyethyl) isocyanurate, 47.5 parts of 1,4-cyclohexane-dimethanol and 322.0 parts of dimer acid (a commercially available dimer of unsaturated fatty acids, having a molecular weight of approximately 590). The reaction mixture is heated, with stirring, to about 165–195° C. under a nitrogen atmosphere, heating and stirring being continued over a period of about 5 hours. When the reaction product reaches an acid number of about 30 the material is cooled quickly to room temperature. The viscous resin is dissolved in methyl ethyl ketone to yield a 60 percent solution which is then clarified by filtration. The resin solution may then be used in formulating coating compositions, or the solvent may be evaporated to yield a clear, very slightly colored resin.

EXAMPLE 6

Preparation of di (2-hydroxyethyl) isoycanurate

Ethylene chlorohydrin (48.3 g., 0.6 mole) is added dropwise with stirring during a two-hour period to an aqueous mixture of cyanuric acid (25.8 g., 0.2 mole) and sodium hydroxide (24 g., 0.6 mole). The mixture is maintained during the addition at reflux temperatures. After the addition, the reaction mixture is refluxed for an additional five-hour period, after which it is cooled and filtered. The precipitate on treatment with dilute hydrochloric acid yields 2 g. of unreacted cyanuric acid. The filtrate containing the desired product is neutralized by the addition of 18 percent aqueous hydrochloric acid and the acidified filtrate is evaporated to dryness in vacuo. The dry residue containing the desired product is extracted with about an equal weight of absolute ethanol. The ethanol extract containing the desired product is cooled in an ice bath, whereupon the desired product of di (2-hydroxyethyl) isocyanurate appears, which precipitate is removed by filtration. The di (2-hydroxyethyl) isocyanurate, obtained as a crystalline product in a yield of 7.7 g., has a melting point after drying and recrystallization of 196° C.

*Elemental analysis.*—Calculated for $C_7H_{11}N_3O_5$: C, 38.71; H, 5.07; N, 19.35. Found: C, 38.16; H, 5.33; N, 18.59.

EXAMPLE 7

Preparation of a polyester of di (2-hydroxyethyl) isocyanurate

The following procedure is representative of the general technique of preparation of polyesters from the dihydroxyethyl isocyanurate:

A mixture of 6.0 g. (0.028 mole) of crude di (2-hydroxyethyl) isocyanurate, 3.0 g. (0.02 mole) of phthalic anhydride and 0.5 g. (0.005 mole) of maleic anhydride is heated with stirring under nitrogen to about 220° C. Heating and agitation are continued at this temperature, with removal of water of condensation. When the reaction mixture reaches an acid number of 50–55, it is cooled rapidly to room temperature. There is obtained about 9 g. of viscous, light colored polyester resin.

EXAMPLE 8

Preparation of mono (2-hydroxyethyl) isocyanurate

A mixture of 56.7 grams (0.44 mole) of cyanuric acid, 17.6 g. (8.44 mole) of sodium hydroxide, 37.2 g. (0.46 mole) of ethylene chlorohydrin, and 1.5 l. of distilled water is refluxed for eighteen hours. The reaction mixture is concentrated in vacuo to a volume of 200 ml., and the concentrate is cooled in an ice bath, whereupon a precipitate appears. The precipitate containing unreacted cyanuric acid is removed by filtration. The filtrate containing mono (2-hydroxyethyl) isocyanurate product is evaporated to dryness in vacuo, and the product residue is extracted with hot absolute ethanol. The ethanol extract is cooled bringing about the precipitation of mono (2-hydroxyethyl) isocyanurate, which is removed by filtration, yielding 27.8 g. of a crude product. On recrystallization from absolute ethanol, a purified product having a melting point of 221–3° C. is obtained.

*Elemental Analysis.*—Calculated for $C_5H_7N_3O_4$: C, 34.6; H, 4.0; N, 24.2. Found: C, 35.5; H, 4.1; N, 24.3.

EXAMPLE 9

Preparation of mono (2-hydroxyethyl isocyanurate

Cyanuric acid (12.9 g., 0.1mole) is dissolved in 500 ml. of distilled water containing 4 g. (0.1 mole) of sodium hydroxide. The aqueous mixture is passed through a Pyrex column containing 500 ml. of Amberlite IRA–400. The column containing the cyanurate is washed with about 2 liters of ethanol. To the washed column is added a solution of 80.4 g. (1 mole) of ethylene chlorohydrin dissolved in 500 ml. of ethanol, thereby bringing about 2-hydroxyethyl substitutions on the cyanurate on the column of resin. The column is then washed with one liter of ethanol and is eluted with one liter of five percent aqueous hydrochloric acid. The acidic eluate is evaporated to dryness in vacuo. The dry residue is extracted with ethanol leaving an undissolved residue of about 2.8 g. of unreacted cyanuric acid.

The ethanol extract containing the desired mono (2-hydroxyethyl) isocyanurate is concentrated to small volume, is cooled in an ice bath to cause precipitation of the product, and the product is removed by filtration, which upon drying yields 2.7 g. of mono (2-hydroxyethyl) isocyanurate which upon recrystallization from absolute ethanol has a melting point in agreement with the preparation of Example 8 above.

Mono (2-hydroxyethyl) isocyanurate may be employed in manufacture of modifiable polyesters as discussed above, or may be used as an intermediate for preparation of other useful substances.

The following example illustrates the manufacture of polyester resins employing as one of the reactants a carboxylic acid having more than two carboxy groups.

EXAMPLE 10

A stirred reactor is charged with 19.3 parts by weight of tris (2-hydroxyethyl) isocyanurate, 25.5 parts by weight of tris (2-carboxyethyl) isocyanurate, 5.4 parts by weight of adipic acid and 15.4 parts by weight of neopentyl glycol. The reaction mixture is then heated, with stirring, to a maximum temperature of about 155–160° C. under a nitrogen atmosphere for about 3 hours until a sample of the product exhibits an acid number of about 69 (ascertained by neutralization of a 0.3544 g. sample with 2.5 ml. of 0.1755 N KOH solution). The resin is poured at about 110° C., forming a slightly tacky solid resin of glass-like appearance on cooling to room temperature.

To test the properties of the resin, particularly with regard to suitability for use in coatings, 5.0 g. of the resin is dissolved in 5 g. of methyl ethyl ketone. To this solution is added 1.2 g. of an 80 percent solution of hexamethoxymethylmelamine and 0.12 g. of p-toluenesulfonic acid. This mixture cures in 1 to 2 seconds on a Thomas Cure Plate at 130° C., indicating suitability of the resin for use in baked enamel coatings.

Other carboxylic acids having three or more carboxy groups may, of course, be used to produce useful resins in a manner similar to that specifically exemplified above.

What is claimed is:

1. A polymeric ester of a mixture consisting of tris (2-hydroxyethyl) isocyanurate, propylene glycol and adipic acid.

2. A polymeric ester of a mixture consisting of tris (2-hydroxyethyl) isocyanurate, 1,4-cyclohexanedimethanol and a dimer of unsaturated fatty acids.

3. A polymeric ester of a mixture consisting of tris (2-hydroxyethyl) isocyanurate, tris (2-carboxyethyl) isocyanurate, adipic acid and neopentyl glycol.

References Cited

UNITED STATES PATENTS

| 2,371,133 | 3/1945 | Graenacher et al. | 260—404.5 |
| 2,414,289 | 1/1947 | Ericks | 260—2 |
| 2,706,194 | 4/1955 | Morris et al. | 260—247 |
| 2,809,942 | 10/1957 | Cooke | 260—2 |
| 2,894,950 | 7/1959 | Lloyd et al. | 260—248 |
| 2,934,525 | 4/1960 | Fekete | 260—88.1 |
| 2,971,024 | 2/1961 | Zaugg et al. | 260—485 |
| 3,037,979 | 6/1962 | Fukui et al. | 260—248 |
| 3,075,979 | 1/1963 | Tazuma et al. | 260—248 |
| 3,211,585 | 10/1965 | Meyer et al. | |
| 3,235,553 | 2/1966 | Sadle. | |

OTHER REFERENCES

Frazier, T. et al.; J. Org. Chem., vol. 25, November 1960, "Isocyanurates. I. Some Condensation Reactions of Cyanuric Acid," pp. 1944–1946.

Allied Chemical Product Bulletin, "Cyanuric Acid," Allied Chem. Co., Nitrogen Div., May 1959, pp. 2, 3, 4 and 6.

Smolin et al., "s-Triazines and Derivatives," Interscience Publishers Inc., N.Y., February 1959, pp. 45 to 47 and 396 to 400.

WILLIAM H. SHORT, *Primary Examiner.*

L. L. LEE, *Assistant Examiner.*

U.S. Cl. X.R.

260—77.5, 248